United States Patent Office 3,447,700
Patented June 3, 1969

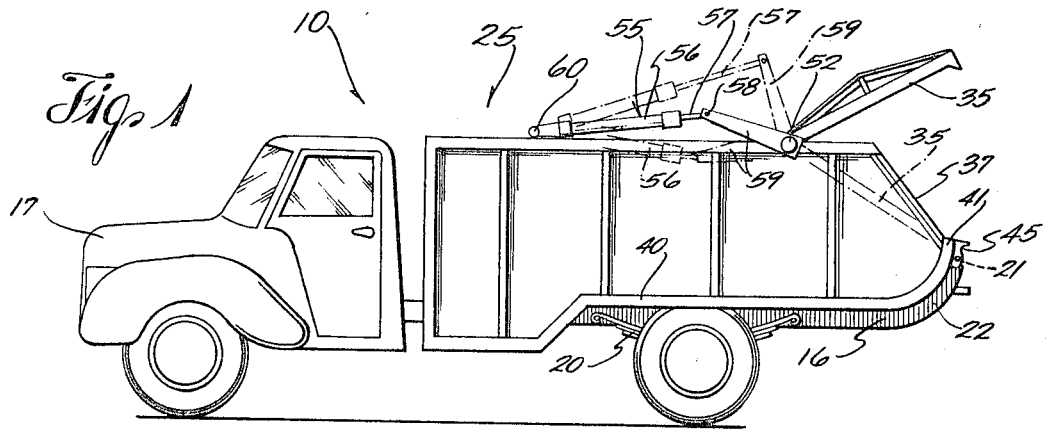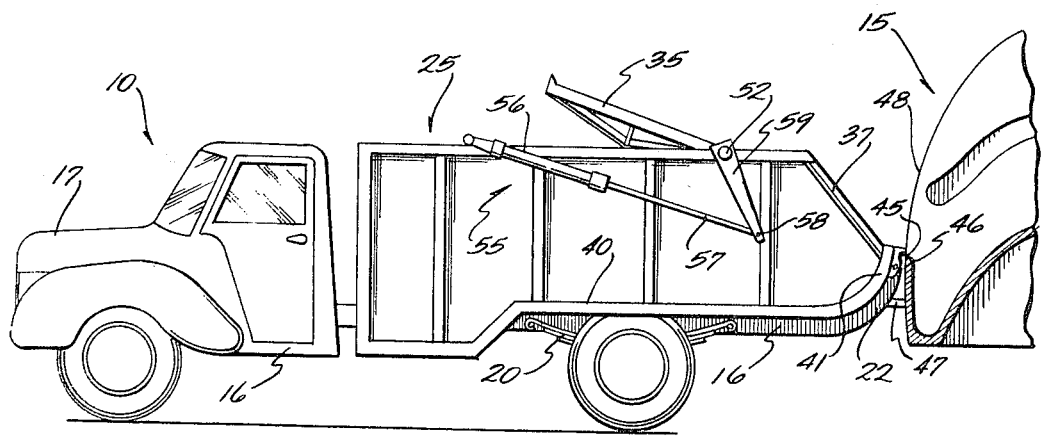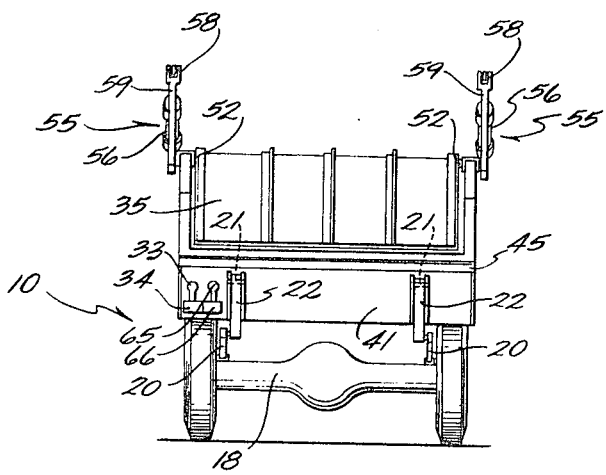

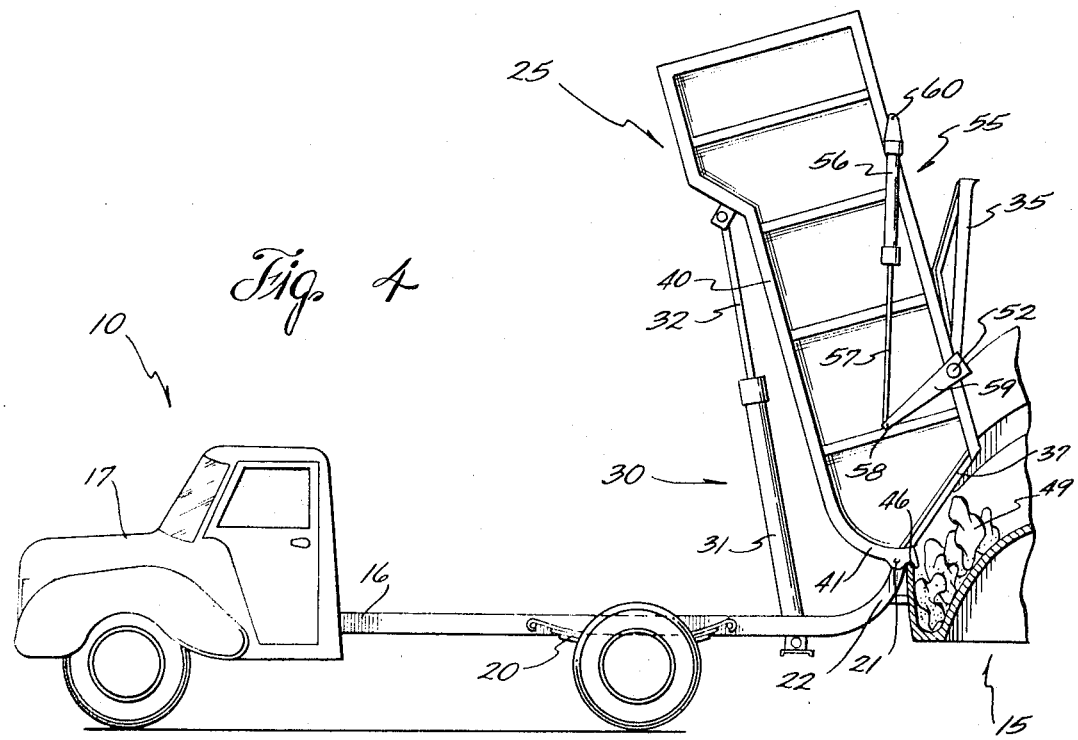
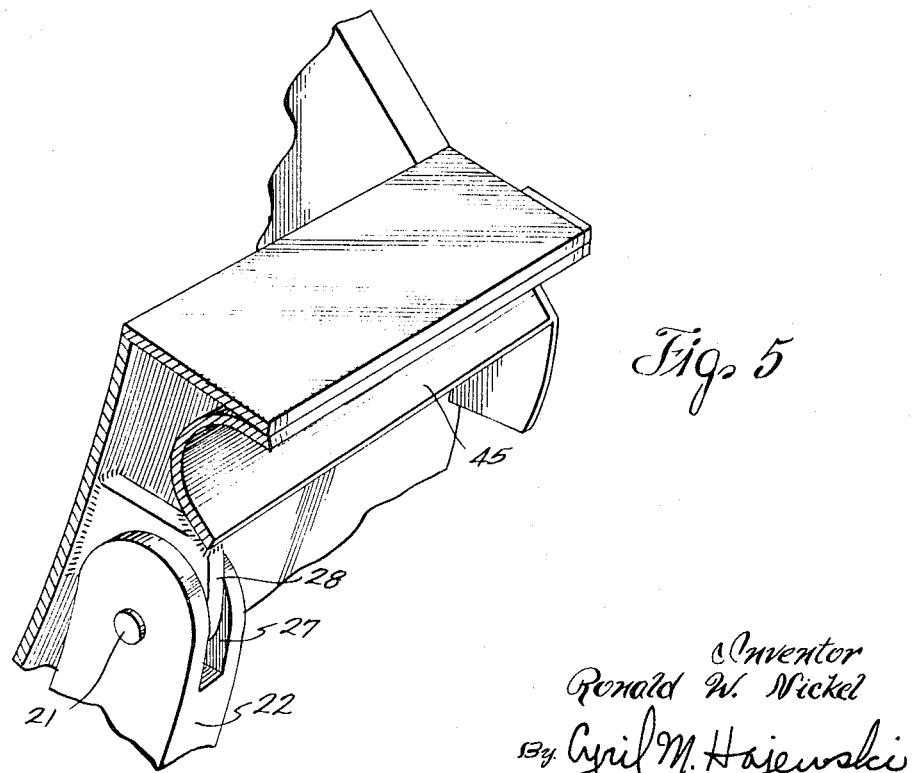

3,447,700
DUMP TRUCK ARRANGEMENT FOR DUMPING MATERIAL FROM ONE TRUCK TO ANOTHER
Ronald W. Nickel, 604 Glenview Ave.,
Oconomowoc, Wis. 53066
Filed May 25, 1966, Ser. No. 552,765
Int. Cl. B65g 67/02; B60p 1/16, 1/28
U.S. Cl. 214—38      12 Claims

ABSTRACT OF THE DISCLOSURE

A trucking arrangement in which a small dump truck is adapted to dump its contents into a larger truck for hauling to a remote destination. The small dump truck is provided with a coupling means that engages the larger truck when the dump body on the small truck is elevated. This couples the two trucks together so that they cannot separate during the transfer operation and the trucks are held in relative positions so that the large truck receives the contents being discharged out of the small truck.

---

It frequently occurs where material must be hauled a long distance that only a small truck is able to be used to pick up the material at its location. Such situation often exists in the hauling of refuse and particularly when refuse is being collected from individual residences. The maximum load that may be driven over the streets in such area is usually strictly limited so that the size of the truck is limited accordingly. Moreover it is inconvenient and uneconomical to employ a large refuse truck for making the individual collections of refuse from residences. Furthermore, when the ultimate destination of the refuse is located a long distance from the pickup area it is also very uneconomical to drive the small pickup truck with a light load of refuse to the discharge point.

The present invention provides the ideal solution to this problem by providing relatively small dump trucks for collecting the refuse at the individual residences and especially adapting these small refuse trucks to discharge the refuse contained therein directly into a relatively large truck referred to as the mother truck. With this arrangement a single mother truck can service a number of the small trucks, and when filled can make the long trip with a heavy load to deliver its contents to the ultimate destination.

It is, therefore, a general object of the present invention to provide an improved refuse truck.

Another object of the invention is to provide an improved method of collecting refuse whereby small dump trucks are employed to make the individual collections and these dump trucks dump their contents directly into a large mother truck which delivers the refuse to its ultimate destination.

Another object of the present invention is to provide an improved refuse truck that is especially adapted for the collection of refuse from its source and to dump the refuse so collected into a large truck for hauling to its ultimate destination.

Another object is to provide an improved dump truck with an improved coupling mechanism for coupling it to a larger truck while it is dumping its contents into the larger truck to prevent escape of the refuse during the dumping operation.

Another object is to provide a dump truck that is adapted to dump its contents into a larger truck and is provided with an improved coupling mechanism that becomes operative by the movement of the truck body in a dumping operation to couple the dump truck to the large truck with the coupling mechanism being automatically released when the truck body is returned to its loading position.

Another object is to provide a refuse truck with a dump body having a configuration which eliminates the requirement for sealing members to retain liquids within the body until it is dumped.

A further object is to provide a refuse truck with an improved power operated packing door that may be fully retracted against the exterior surface of the truck body to furnish adequate clearance during the dumping of its contents directly into a large truck.

A further object is to provide an improved refuse truck of simple and inexpensive but sturdy construction which is efficient in operation.

According to this invention the improved refuse truck is especially adapted to dump its contents into a mother truck. During such dumping operation it is coupled to the mother truck to insure that none of the refuse escapes from the trucks during the dumping operation. The truck is backed against a back opening of the mother truck. The body is then pivoted upwardly to dump its contents, and as it does so, a semicylindrical bar engages a lip on the mother truck to couple the two trucks together. Since the truck bodies are spring mounted, they readily yield to the forces that may occur to depress the large truck and elevate the small truck during the dumping operation. When the dumping operation is completed, the truck body is returned to its loading position, and as it moves toward this position, the coupling mechanism is automatically released so that each truck can proceed independently of the other.

During a dumping operation into a mother truck the packing door must be fully retracted against the exterior of the truck body to provide clearance for the operation. This is accomplished by a hydraulic actuator in the form of a piston and cylinder mechanism operating in conjunction with a novel linkage having an overcenter arrangement. When the piston and cylinder mechanism is energized fully in one direction, it opens the packing door to a loading position to provide the operator with access to the interior of the truck body for placing refuse therein. When the hydraulic actuator is reversed the packing door is normally returned to its closed position. However, when the door is in its loading position, if manual pressure is applied to the linkage which connects the hydraulic actuator to the door to shift the linkage past the central position, the reverse operation of the hydraulic actuator will not return the door to its closed position, but instead, will shift it in the opposite direction to the dumping position against the exterior surface of the truck body where the door will not interfere with the dumping of the contents into the mother truck.

The rear end of the improved truck body is curved upwardly to retain liquids in the truck. However, the truck body is pivotable in a dumping operation about an axis which is located toward the top of this curved portion of its rear end. As a result, during the dumping operation the liquid is readily discharged with the other contents of the truck.

The foregoing and other objects of this invention which will become more fully apparent from the following detailed description of an embodiment thereof may be achieved by the apparatus herein described by way of example in connection with the illustration of its structural components in the accompanying drawings, in which:

FIGURE 1 is a view in side elevation illustrating a refuse truck incorporating the features of the present invention with the truck body and packing door being shown in the loading position for receiving the refuse that is to be moved;

FIGURE 2 is the same view as FIGURE 1 but the packing door is shown fully retracted to its dumping position to provide clearance for dumping the contents of the truck into the mother truck;

FIGURE 3 is a rear view of the truck illustrated in FIGURES 1 and 2 except that the packing door is depicted in its closed positions;

FIGURE 4 is another side elevational view of the truck shown in FIGURE 1 but with the truck body raised to its dumping position and shown dumping its contents into a mother truck; and FIGURE 5 is an enlarged detail perspective view of the coupling member shown on the truck in FIGURE 1.

Reference is now made more particularly to the drawings and particularly to FIG. 2 which illustrates a small pickup truck generally identified by the reference numeral 10 positioned relative to its larger mother truck which is generally identified by the reference numeral 15, with only the rear end of the mother truck 15 being depicted in the drawing. The small pickup truck is especially adapted to travel into residential areas and move into the locations where relatively small quantities of refuse are collected. The relatively small pickup truck 10 is also especially adapted to dump its load of refuse into the larger mother truck 15 which will deliver it to its ultimate destination. This arrangement provides a small refuse truck for convenient collection of light loads of refuse and yet avoids the necessity of the relatively small pickup truck hauling the refuse over long distances to deliver the refuse to its ultimate destination. It results in much more economical operation while providing superior service.

The pickup truck 10 comprises a conventional frame 16 and a cab 17 with the frame 16 being supported on a rear axle 18 by a spring suspension 20. A body 25 is mounted on the frame 16 and is especially adapted for carrying refuse. To this end, it is fully enclosed and is carried on the frame 16 by a pair of spaced pivot pins 21 for pivotal movement between the horizontal loading position illustrated in FIG. 1 and a substantially vertical position for dumping its contents in the manner depicted in FIG. 4.

As best seen in FIG. 5, each of the two side beams of the frame 16 are provided with upwardly curved rear ends 22. The rearmost extremity of each of these curved ends 22 is provided with a longitudinally extending slot 27 for receiving a pivot plate 28 that is secured to the body 25. Both end portions 22 and their associated plates 28 are provided with suitable holes for receiving the pin 21 to pivotably support the body 25 for pivotal movement relative to the frame 16. In FIG. 5, the pivotal connection between the left side beam of the frame 16 and the body 25 is shown in detail. The identical structure is provided on the right beam of the frame 16 for pivotably supporting the body 25 on both sides.

A hydraulic piston and cylinder mechanism 30 is mounted underneath the truck for actuating the body 25 in its pivotal movement in conventional manner as shown in FIGURE 4. To this end, the cylinder 31 has one end pivotably connected to the frame 16. A connecting rod 32 extends from the opposite end of the cylinder 31 and has its free end pivotably connected to the underside of the body 25. A piston (not shown) is slidably contained within the cylinder 31 and is secured to the connecting rod 32. Hydraulic pressure is directed into either end of the cylinder 31 under the control of a regulating handle 33 which actuates a valve 34 for controlling the flow of hydraulic pressure into the cylinder 31. Movement of the handle 33 to the left, as viewed in FIG. 3, will direct hydraulic pressure into the cylinder 31 for raising the body 25 to its dumping position shown in FIG. 4. On the other hand, movement of the handle 33 in a rightward direction as viewed in FIG. 3, will direct hydraulic pressure into the cylinder 31 for lowering the body 25 to its loading position as illustrated in FIG. 1.

The regulating handle 33 is shown in its neutral position in FIG. 3.

The body 25 is completely enclosed except for a rear opening 37 which may be closed by a packing door 35. A floor plate 40 of the body 25 has its rear end 41 curved upwardly about a radius that compliments the curved ends 22 of the farme 16 so that the rear end 41 of the body 25 will nest into the curved upper surface of the two side beams of the frame 16.

The upwardly curved rear end 41 of the body 25 serves the very important function of retaining liquids within the interior of the body 25. Some of the refuse that is collected may have liquids in it which have an unpleasant odor, and it is important that they be prevented from escaping out of the truck. It has been the practice to provide sealed doors for retaining these liquids but such seals are subject to malfunctioning and require frequent maintenance. The upwardly curved portion of the body 25 retains the liquids within the dump body 25 without the necessity of such seals and from the following description it will be apparent that despite the upwardly curved rear end of the truck body 25 it causes the liquids to be conveniently discharged from within the interior of the body 25 when the load is dumped.

The pivot plates 28 are mounted at the upper portion of the upwardly curved rear end 41 so that when the body 25 is raised to the dumping position illustrated in FIG. 4, the upper edge of the curved rear end 41 is moved downwardly while the remaining portion of the curved end 41 is pivoted upwardly with the body 25. With this arrangement, and the curved surface at the rear end of the floor 40, the liquids readily flow from the curved rear end 41 through the rear opening 37 in the body 25 so that any liquid in the truck body 25 is readily discharged therefrom.

As previously mentioned, the pickup truck 10 is especially adapted to dump its contents into a relatively larger mother truck 15 so that the delivery of the refuse to its ultimate destination may be carried out by the larger vehicle. In order to insure complete transfer of the contents of the small truck into the mother truck without any escape of the refuse during the transfer operation, the small pickup truck 10 and the mother truck 15 are coupled to each other during the dumping of the contents of the small truck into the mother truck. Such coupling is accomplished automatically by the elevating of the body 25 of the pickup truck 10 toward its dumping position. To this end, the dump body 25 is provided with a semicylindrical coupling bar 45 which extends across the width of the body 25 at its rearmost end for engagement with an upper edge 46 of a tail plate 47 provided on the mother truck 15. The upper edge 46 defines the bottom of a loading opening 48 provided in the body of the mother truck 15. It will be noted from the views in FIGS. 1 and 2 that the semicylindrical coupling bar 45 is at the uppermost end of the curved portion 41 of the body 25 so that it also comprises the rearmost end of the truck. Moreover, the coupling bar 45 extends across the width of the truck with its axis in a substantially horizontal position directly above the horizontal pivot pins 21 about which the dump body 25 pivots in its dumping operation. Accordingly, as the dump body 25 is pivoted upwardly from the horizontal loading position illustrated in FIG. 2 to the substantially vertical dumping position illustrated in FIG. 4, the cylindrical bar 45 will pivot with the truck body 25 approximately 90°. Since the pivot pins 21 are located beneath the coupling bar 45, the latter will move downwardly in an arcuate path as the dump body 25 is raised so that the coupling bar 45 moves into engagement with the upper edge 46 of the tail plate 47 on the mother truck 15. The pivot pins 21 are normally located slightly below the upper edge 46 of the tail plate 47 so that as the coupling bar 45 moves downwardly in its arcuate movement with the pivotal movement of the dump body 25, it engages the upper edge 46, and as the elevation of the dump body 25 continues, a downward pressure is applied upon the tail plate 47. Since the entire frame 16 is mounted on the spring suspension 20, the frame 16 yields to this pressure and rises to accommodate it. Of course, the frame of the mother truck 15 likewise is mounted on a spring suspension so that it too may yield to such pressure. As a result, a very secure coupling engagement is achieved between the pickup truck 10 and the mother truck 15. Although strong forces may exist tending to separate the trucks, they remain coupled together during the dumping operation so that there is very little possibility of the escape of refuse during its transfer from the pickup truck 10 to the mother truck 15.

In operation, when it is desired to transfer a load from the pickup truck 10 to the mother truck 15, the pickup truck 10 is backed toward the mother truck 15 so that the rear ends of both trucks are in immediate proximity to each other and in substantial alignment. Any minor misalignment will be readily accommodated by reason of the spring mounting of both truck bodies which will enable them to yield a limited amount to the various forces which may be applied. After the two trucks are positioned back to back, the regulating handle 35 of the pickup truck 10 is shifted to direct hydraulic pressure into the cylinder 31 for raising the dump body 25. As the body 25 raises, the coupling bar 45 moves downwardly in its arcuate path, as previously mentioned, and engages the upper edge 46 of the mother truck 15 to couple the two trucks together. As the dump body 45 continues to be raised, the coupling engagement between the coupling bar 45 and the upper edge 46 of the mother truck 15 becomes progressively more secure and the frame 16 of the pickup truck 10 raises to accommodate the pressures applied to the tail plate 47 of the mother truck 15. When the dump body 25 is in its fully raised position as depicted in FIG. 4, its opening 37 is actually past the opening 48 and within the body of the mother truck 15 as shown in FIG. 4 so that there is very little, if any, possibility of the refuse 49 escaping during the transfer operation. When the transfer has been completed, the regulating handle 33 is again shifted to direct hydraulic pressure into the cylinder 31 for lowering the dump body 25 to its horizontal loading position. As the dump body lowers, the coupling bar 45 is moved upwardly in its arcuate path to gradually release the upper edge 46. By the time the dump body 25 arrives at its lowermost loading position, the coupling member 45 has completely released the upper edge 46 of the tail plate 47 so that the two trucks are automatically uncoupled and each may proceed independently of the other. The mother truck 15 is a conventional rear loading refuse truck that is used extensively for collecting refuse and hauling it to a particular destination.

The packing door 35 is supported by the body 25 for pivotal movement with the rotation of a pair of stub shafts 52 one of which extends from each side of the door 35 and is journalled in the associated side of the truck body 25. Thus, one stub shaft 52 is journalled in one side of the truck body 25 and the other stub shaft 52 is journalled in the opposite side of the truck body 25 with the two stub shafts 52 being in axial alignment. One of the stub shafts 52 is secured to one edge of the packing door 35 while the other stub shaft 52 is secured to the opposite edge of the same packing door 35. As a result, the packing door 35 is carried by the body 25 for pivotal movement about the axis of the two stub shafts 52.

The packing door 35 is actuated in its pivotal movement by a pair of piston and cylinder mechanisms generally identified by the reference numeral 55. The two piston and cylinder mechanisms 55 are identical and each comprises a cylinder 56 which slidably encloses a piston (not shown) to which a connecting rod 57 is secured and extends outwardly of the cylinder 56. The etxending end of each connecting rod 57 is pivotably secured by a pin 58 to a link 59, the opposite end of the link 59 being keyed to one of the stub shafts 52.

Two links 59 are provided with each being keyed to one of the two stub shafts 52 and each link being connected to one of the piston and cylinder mechanism 55 for actuation thereby. One piston and cylinder mechanism is disposed on one side of the door 35 and the other is located on the opposite side. The end of each cylinder 56 which is opposite to the end from which its associated connecting rod 57 extends is pivotably secured to the top of the dump body 25 by a pin 60 so that the cylinder 56 is free to pivot in a vertical plane along the side of the body 25.

The packing door 35 serves the double function of closing the opening 37 as well as to pack the refuse that is dumped through the opening 37 into the interior of the body 25 and to compress the refuse within the body. The door 35 is shown in FIG. 1 in its normal open position to clear the opening 37 for loading refuse into the truck. When the refuse accumulates in the vicinity of the opening 37 it is only necessary for the operator to shift a regulating handle 65 to actuate a cooperating valve 66 for directing hydraulic pressure into both cylinders 56 to force the connecting rods 57 outwardly and thereby pivot the links 59 in a clockwise direction as viewed in FIG. 1 for pivoting the door 35 downwardly into the interior of the body 25 for forcing the refuse that is dumped therein into the forward portion of the dump body 25. As the body 25 fills with refuse, the actuation of the door 35 in this manner serves to compress the refuse to increase the capacity of the truck. In FIG. 1, as previously mentioned, the door 35 is shown in its normal open position to render the opening 37 accessible to the operator for loading refuse into the truck. When the door 35 is pivoted downwardly to the position represented by the broken lines in FIGURE 1, the opening 37 is closed to prevent the escape of the contents of the body 25. However, the connecting rod 57 may be forced outwardly to a greater extent to pivot the door 35 into the truck beyond the position represented by the broken lines in FIG. 1 to force the refuse into the interior of the body 25 and compress it.

The opening 37 of the body 25, of course, must be open when the contents are being dumped into the mother truck 15. However, when the packing door 35 is in the open position illustrated in FIG. 1, it interferes with the upward movement of the dump body 25 when the pickup truck 10 is coupled to the mother truck 15. During the raising of the dump body 25 if the packing door 35 were allowed to remain in the position shown in FIG. 1 during the raising of the dump body 25, it would strike the body of the mother truck 15. It is therefore necessary to pivot the packing door 35 in a counterclockwise direction from the position illustrated in FIG. 1 to locate it against the top of the dump body 25 in the manner illustrated in FIG. 2. Normally, if the packing door 35 is in the open position illustrated in FIG. 1, and the connecting rod 57 is extended outwardly of the cylinder 56, the packing door 35 will be pivoted downwardly to its closed position into the interior of the dump body 25. However, the same extension of the connecting rod 57 may also produce a pivotal movement of the packing door 35 in the opposite direction to the position shown in FIG. 2. This is accomplished by merely forcing the pins 58 and their associated mechanisms downwardly from the position illustrated by solid lines in FIG. 1 to a point beneath the center as represented by the broken lines in FIG. 1. The pins 58 are shown located above the central position in FIG. 1 and then will normally remain in this position, due to the weight of the door 35, to actuate the packing door 35 downwardly from the position shown in FIG. 1 in response to extension of the connecting rods 57. However, there is sufficient play in the various connections and the connecting rods 57 may be forced further into the cylinders 56 so that if the operator will grasp either one of the cylinders 56 or a link 59 and force it downwardly or push the door 35 upwardly in a counterclockwise direction as viewed in FIGURE 1, the pins 58 will move downwardly beneath the central position to the position represented by the broken lines in FIGURE 1.

The operator need apply the downward force to only one of the links 59 and the other will move with it by reason of their connection to each other through the two stub shafts 52 and the door 35. Both pins 58 will shift to a location beneath the center and subsequent extension of the connecting rods 57 will then not move the links 59 in a clockwise direction, but rather in a counterclockwise direction to pivot the packing door 35 upwardly from the position shown in FIG. 1 into engagement with the upper surface of the dump body 25 as illustrated in FIG. 2. When the packing door 35 is thus located, sufficient clearance is provided with respect to the body of the mother truck 15 so that the dump body 25 of the pickup truck 10 is free to be raised to its dumping position as illustrated in FIG. 4.

After the dumping operation has been completed, the packing door 35 may be returned to its open position illustrated in FIG. 1 by directing hydraulic pressure into the cylinders 56 for retracting the connecting rods 57 into the cylinders. When the connecting rods 57 are fully retracted, the pins 58 will be raised to the above center position by the weight of the door 35 acting through the links 59. The pins 58 and their associated mechanism will therefore move to the position indicated by the solid lines in FIGURE 1 as a result of the retraction of the connecting rods 57 into the cylinders 56. Then, even though the connecting rods 57 are moved in the opposite direction to extend them out of the cylinders 56, the packing door 35 will continue to rotate in the same direction from the position illustrated in FIG. 1 to the interior of the truck body 25.

With this arrangement, reasonable size piston and cylinder mechanisms may be employed for obtaining a complete pivotal positioning of the packing door 35 from a position well within the interior of the truck body 25 to a position wherein the door 35 rests upon the top exterior surface of the truck body 25. When the packing door 35 is in the position represented by the broken lines in FIG. 1 to close the opening 37, the opening may be opened for loading by retracting the connecting rods 57 into the cylinders 56. When the connecting rods 57 are fully retracted, further pivotal movement of the packing door 35 in the same counterclockwise direction can be obtained by reversing the operation of the piston and cylinder mechanisms 55, if the pins 58 and their associated mechanisms are forced downwardly below the center position before the connecting rods 57 are extended from the cylinders 56. To reverse the operation, a similar procedure is completed. The packing door 35 will be moved in a clockwise direction from the position shown in FIG. 2 by retracting the connecting rods 57 into the cylinders 56. Then, when the connecting rods 57 are fully retracted, the weight of the door 35 will force the pins 58 and their associated mechanisms above the central position as illustrated by solid lines in FIG. 1 and then, reverse operation of the piston and cylinder mechanisms 55 to extend the connecting rods 57 will continue the pivotal movement of the packing door 35 in the same clockwise direction to the interior of the dump body 25.

From the foregoing detailed description of the present invention, it will be readily understood that an improved method of collecting refuse has been provided with the method being carried out by an improved refuse pickup truck that is especially adapted to dump its contents into a larger mother truck for hauling to its ultimate destination, and the body of the pickup truck being arranged to retain liquids during normal operation without the use of seals, at its loading opening but such liquids being readily discharged with the contents of the truck when the contents are dumped out of the truck.

Although the illustrative embodiment of the invention has been described in considerable detail for the purpose of disclosing a practical operative structure whereby the invention may be practiced advantageously, it is to be understood that the particular apparatus described is intended to be illustrative only and that the novel characteristics of the invention may be incorporated in other structural forms.

The principles of the invention having now been fully explained in connection with the foregoing description of the illustrative embodiments the invention is hereby claimed as follows.

I claim:

1. In a dump truck that is adapted to dump its contents into a second truck; a frame; a dump body carried by said frame for pivotal movement between a depressed position for loading material into it and an elevated position for dumping its contents; and coupling means mounted on the dump body for coupling the dump truck to the second truck while the dump truck is dumping its contents into the second truck to secure said dump truck to said second truck in position so that the elevation of said dump body will dump its contents into said second truck and prevent separation of the two trucks while the dumping operation is being completed, said coupling means being actuated into engagement with the second truck by the pivotal elevating movement of said dump body for coupling the two trucks together and being released by the downward pivotal movement of said dump body to release the trucks for independent operation.

2. A dump truck according to claim 1 wherein said coupling means comprises a horizontal bar having a recessed portion located above the pivot axis of said dump body so that as said dump body is being elevated to its dumping position said horizontal bar is moved in an arcuate path downwardly to move its recessed portion into engagement with a horizontal edge on the second truck for coupling the two trucks together, and when horizontal bar moves in an arcuate path upwardly, out of engagement with the second truck.

3. A dump truck according to claim 2 wherein said dump body includes an opening through which material is loaded into it and through which its contents are discharged during the dumping operation, and the second truck includes an opening through which the contents of said dump body are dumped into the second truck, said horizontal edge of the second truck defining the bottom of the opening in the second truck so that when it is engaged by said horizontal bar of the dump body, the dump body extends through the opening in the second truck with its opening within the second truck to prevent the escape of any material during the dumping operation.

4. A dump truck according to claim 1 having an opening through which material is loaded into it and through which its contents are discharged during the dumping operation, and including a packing door movably carried by said dump body for packing its contents into the interior of said dump body, said packing door being movable to a normally open position for rendering the dump body opening accessible for receiving the material to be loaded into the truck, said packing door being also movable beyond its normally open position against the roof of the dump body to provide clearance relative to the second truck when the dump truck is dumping its contents into the second truck.

5. A dump truck according to claim 4 including a link having one end connected to said packing door so that rotary movement of said link actuates said door in its movement; and a power actuator connected to said link for rotating said link to effect the movement of said door, said actuator being energizable in one direction for moving said door in a first direction to its open position, the connection between said power actuator and said link being movable past a center position so that energization of said power actuator in the opposite direction will continue movement of said door in the same first direction past its open position to a clearance position adjacent to the body of dump truck to avoid interference with the second truck during the dumping operation for dumping the contents of said dump truck into the second truck.

6. A dump truck according to claim 1; wherein said dump body includes a floor and is provided with an opening at its rear end through which the contents of the dump body are loaded into said body and discharged therefrom, and the rear end of said floor is curved upwardly with the uppermost edge of the curved portion defining the bottom of the opening so that the upwardly curved portion retains liquids within the dump body when the latter is in its depressed position but when said dump body is pivoted to its elevated position the liquid readily flows along said curved portion and out of the body through the opening.

7. In a trucking system for hauling material; a motor driven dump truck for receiving the material to be hauled; a frame on said dump truck; a dump body carried by said frame for pivotal movement between a depressed position for loading material into it and an elevated position for dumping its contents; a second motor truck for receiving the material from said dump truck for hauling it to its destination; and coupling means on said dump truck and on said second truck, said coupling means being engageable for coupling said second truck to said dump truck in position to receive the material being dumped out of said dump truck by the elevation of said dump body, and to secure said trucks together while the contents of said dump truck are being dumped into said second truck without interfering with the dumping operation, said coupling means being activated into engagement by the pivotal elevating movement of said dump body to couple the two trucks together, and being released by the downward pivotal movement of said dump body to release the trucks for independent operation.

8. A trucking system according to claim 7 wherein; said coupling means comprises a substantially horizontal bar on said dump body, said horizontal bar having a recessed portion located above the pivot axis of said dump body so that as said dump body is being elevated to its dumping position said horizontal bar is moved in an arcuate path downwardly to move its recessed portion into engagement with said horizontal edge on said second truck for coupling the two trucks together, and when said edge on said second truck; and a substantially horizontal said dump body is returned to its depressed position, said horizontal bar moves in an arcuate path upwardly, out of engagement with said horizontal edge of said second truck.

9. A trucking system according to claim 8 wherein; said dump body includes an opening through which material is loaded into it and through which its contents are discharged during the dumping operation, and said second truck includes an opening through which the contents of said dump body are dumped into said second truck, said horizontal edge of said second truck defining the bottom of the opening in the second truck so that when it is engaged by said horizontal bar of said dump body, the dump body extends through the opening in the second truck with its opening within the second truck to prevent the escape of any material during the dumping operation.

10. A trucking system according to claim 8 wherein; said dump body includes a floor and is provided with an opening at its rear end through which the contents of the dump body are loaded into said body and discharged therefrom, and the rear end of said floor is curved upwardly with the uppermost edge of the curved portion defining the bottom of the opening so that the upwardly curved portion retains liquids within the dump body when the latter is in its depressed position but when said dump body is pivoted to its elevated position the liquid readily flows along said curved portion and out of the body through the opening, and said horizontal bar extends along said uppermost edge of said curved portion.

11. A trucking system according to claim 7 wherein; said dump truck includes an opening through which material is loaded into it and through which its contents are discharged during the dumping operation, and including a packing door movably carried by said dump body for packing its contents into the interior of said dump body, said packing door being movable to a normally open position for rendering the dump body open accessible for receiving the material to be loaded into the truck, said packing door being also movable beyond its normally open position against the roof of the dump body to provide clearance relative to the second truck when the dump truck is dumping its contents into the second truck.

12. A trucking system according to claim 11 wherein; said dump truck includes a link having one end connected to said packing door so that rotary movement of said link actuates said door in its movement; and a power actuator connected to said link for rotating said link to effect the movement of said door, said actuator being energizable in one direction for moving said door in a first direction to its open position, the connection between said power actuator and said link being movable past a center position so that energization of said power actuator in the opposite direction will continue movement of said door in the same first direction past its open position to a clearance position adjacent to the body of said dump truck to avoid interference with said second truck during the dumping operation for dumping the contents of said dump truck into said second truck.

References Cited

UNITED STATES PATENTS

| | | | |
|---|---|---|---|
| 3,147,870 | 9/1964 | Urban et al. | 214—302 |
| 2,494,735 | 1/1950 | Ambarcumian. | |
| 3,212,653 | 10/1965 | Keen | 214—44 XR |

ROBERT G. SHERIDAN, *Primary Examiner.*

U.S. Cl. X.R.

214—83.3, 503; 298—17